(12) United States Patent
Matsui

(10) Patent No.: US 11,093,070 B2
(45) Date of Patent: Aug. 17, 2021

(54) TOUCH PANEL CONTROL DEVICE, TOUCH PANEL CONTROL METHOD, AND INPUT DISPLAY DEVICE

(71) Applicant: SHARP KABUSHIKI KAISHA, Sakai (JP)

(72) Inventor: Kuniaki Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/911,310

(22) Filed: Jun. 24, 2020

(65) Prior Publication Data

US 2021/0004118 A1 Jan. 7, 2021

(30) Foreign Application Priority Data

Jul. 2, 2019 (JP) .............................. JP2019-123449

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0416; G06F 3/0412; G06F 3/044
See application file for complete search history.

(56) References Cited

U.S. PATENT DOCUMENTS

2012/0256861 A1* 10/2012 Park ...................... G06F 3/0412
345/173

FOREIGN PATENT DOCUMENTS

JP         H09-128146 A    5/1997

* cited by examiner

*Primary Examiner* — Peter D McLoone
(74) *Attorney, Agent, or Firm* — ScienBiziP, P.C.

(57) ABSTRACT

A touch panel control device includes a delay setter that sets a delay amount corresponding to a first gate clock signal for controlling a drive timing of a gate line provided in a display panel, and a touch panel driver that outputs a drive pulse for detecting the touch position to a drive electrode based on the delay amount set by the delay setter, wherein the touch panel driver outputs a signal having a predetermined voltage level to the drive electrode and a reception electrode before outputting the drive pulse to the drive electrode.

11 Claims, 7 Drawing Sheets

TOUCH PANEL CONTROL DEVICE, TOUCH PANEL CONTROL METHOD, AND INPUT DISPLAY DEVICE

BACKGROUND OF THE INVENTION

This application is based upon and claims the benefit of priority from the corresponding Japanese Patent Application No. 2019-123449 filed on Jul. 2, 2019, the entire contents of which are incorporated herein by reference.

FIELD OF THE INVENTION

The present disclosure relates to a touch panel control device, a touch panel control method, and an input display device, and particularly to a touch panel control device that controls a touch panel disposed to be overlapped with a screen of a display device so as to output the position signal corresponding to the user's touch position, a touch panel control method, and an input display device including the touch panel control device.

DESCRIPTION OF THE BACKGROUND ART

A touch panel is one of the pointing devices used in combination with a display device. A display device (input display device) including the touch panel is called a touch panel display and is used in various types of devices such as various electronic devices including mobile devices and home appliances.

There are known touch panel displays that have the combination of a capacitive touch panel and a liquid crystal display device using an active matrix drive system. In this combination, the touch panel is disposed to be overlapped with the screen of the liquid crystal display device and output the position signal corresponding to the user's touch position in accordance with the user's touch. Here, noise may occur in the position signal of the touch panel due to the driving of a gate of the liquid crystal display device (a gate of a thin-film transistor (TFT) serving as a switching element (active element) arranged in each pixel). This is what is called gate drive noise and is more likely to occur as the sensor surface of the touch panel is larger, that is, the screen of the liquid crystal display device is larger. The occurrence of the gate drive noise causes, for example, the false recognition of the user's touch on the touch panel even though the touch panel is not touched by the user, that is, the touch panel may malfunction.

There is the disclosure of a conventional art for avoiding the effect of the gate drive noise. For example, according to a conventional art, a timing detection circuitry is provided to detect a match between the output change timing of a liquid crystal drive signal from a liquid crystal driver, which drives the liquid crystal display screen, and the predetermined timing for fetching the output data from the touch panel. When the timing detection circuitry detects no match, the output data is fetched from the touch panel at a predetermined timing. Conversely, when the timing detection circuitry detects a match, the output data is fetched from the touch panel at a timing different from the predetermined timing. This prevents the fetching of the output data from the touch panel at the output change timing of the liquid crystal drive signal from the liquid crystal driver, i.e., at the driving timing of the gate line of the liquid crystal display device. As a result, the effect of the gate drive noise is avoided.

Here, the gate drive noise actually occurs in the position signal of the touch panel at the timing delayed by a predetermined time from the driving timing of the gate line of the liquid crystal display device. Therefore, with the conventional art, it is difficult to ensure the avoidance of the effect of the gate drive noise. When the output data is not fetched from the touch panel during the period from the driving timing of the gate line to the occurrence timing of the gate drive noise in the position signal of the touch panel, the number of times scanning is executed in the touch panel is reduced, and the position detection accuracy is degraded.

Furthermore, the occurrence of the gate drive noise is more noticeable as the relative distance between the touch panel and the screen of the liquid crystal panel is smaller, particularly in the structure where the touch panel is attached to the screen of the liquid crystal display device by the known direct bonding. Therefore, in the structure using the direct bonding, there is a need to further ensure that the effect of the gate drive noise is avoided.

SUMMARY OF THE INVENTION

An object of the present disclosure is to provide a touch panel control device, a touch panel control method, and an input display device with which it is possible to ensure the avoidance of the effect of a gate drive noise and to prevent a decrease in the position detection accuracy.

A touch panel control device according to an aspect of the present disclosure controls a touch panel disposed to overlap with a display panel and including a reception electrode that outputs a position signal corresponding to a touch position touched by a user and a drive electrode that is opposite to the reception electrode, the touch panel control device including: a delay setter that sets a delay amount corresponding to a first gate clock signal for controlling a drive timing of a gate line provided in the display panel; and a touch panel driver that outputs a drive pulse for detecting the touch position to the drive electrode based on the delay amount set by the delay setter, wherein the touch panel driver outputs a signal having a predetermined voltage level to the drive electrode and the reception electrode before outputting the drive pulse to the drive electrode.

A touch panel control method according to another aspect of the present disclosure is to control a touch panel disposed to overlap with a display panel and including a reception electrode that outputs a position signal corresponding to a touch position touched by a user and a drive electrode that is opposite to the reception electrode, the touch panel control method causing one or more processors to execute: a delay setting process for setting a delay amount corresponding to a first gate clock signal for controlling a drive timing of a gate line provided in the display panel; and a touch panel driving process for outputting a drive pulse for detecting the touch position to the drive electrode based on the delay amount set in the delay setting process, wherein, in the touch panel driving process, a signal having a predetermined voltage level is output to the drive electrode and the reception electrode before the drive pulse is output to the drive electrode.

An input display device according to another aspect of the present disclosure includes: a display device that displays an image on a display panel; a touch panel that is disposed to overlap with the display device and outputs a position signal corresponding to a user's touch position; and the above-described touch panel control device.

According to the present disclosure, it is possible to ensure the avoidance of the effect of the gate drive noise and to prevent a decrease in the position detection accuracy.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DESCRIPTION OF THE PREFERRED EMBODIMENTS

An embodiment of the present disclosure is described below with reference to the accompanying drawings. The embodiment described below is an example of the embodiment of the present disclosure and does not limit the technical scope of the present disclosure.

The present disclosure is applied to, for example, a touch panel display.

Before the touch panel display to which the present disclosure is applied is described, a touch panel display according to a reference example is described.

Figure 1:
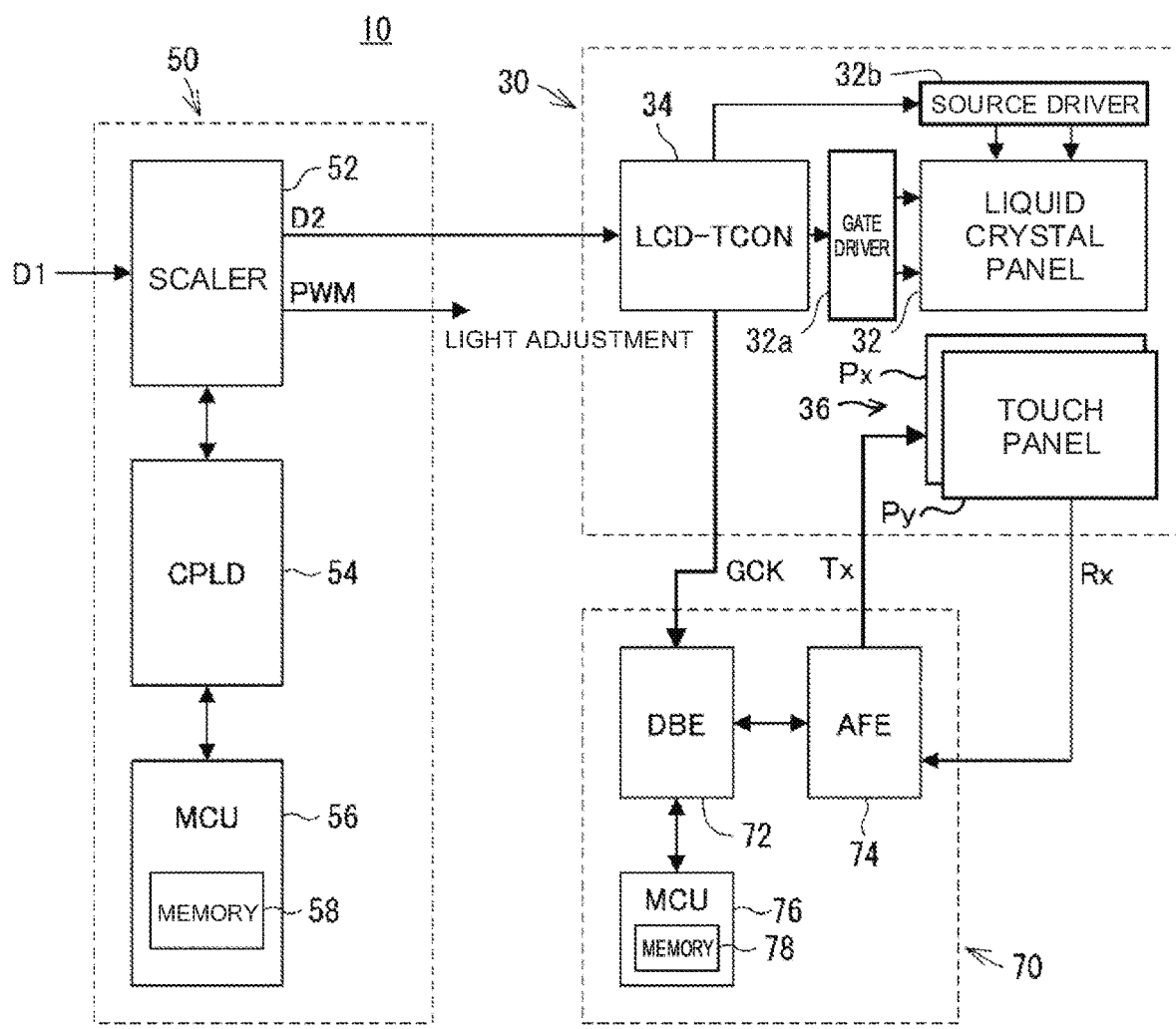
FIG. 1 is a block diagram illustrating a schematic configuration of an electrical part of a touch panel display according to a reference example.

FIG. 1 is a block diagram illustrating a schematic configuration of an electrical part of a touch panel display 10 according to the reference example. As illustrated in FIG. 1, the touch panel display 10 includes a liquid crystal module 30, a main interface board 50, and a touch panel control board 70.

The liquid crystal module 30 includes a liquid crystal panel 32 using an active matrix drive system, a gate driver 32a (gate driver), a source driver 32b (source driver), a liquid crystal timing controller (LCD-TCON: liquid crystal display timing controller) 34, and a touch panel 36.

Although not illustrated in detail, the liquid crystal panel 32 includes a polarization filter, a glass substrate, a liquid crystal layer, a backlight, etc. to form the screen (image display screen) for displaying information such as videos described later. The number of pixels of the screen in the horizontal direction and the vertical direction is, for example, 1920×1080 or 3840×2160. Wires including a gate line (scan line) and a source line (data line), a TFT, electrodes including a pixel electrode and a common electrode, and the like, are formed on the glass substrate.

As described later, the gate driver 32a receives a gate line control signal for controlling the drive timing of a gate line such as a gate clock signal GCK and a gate start pulse signal GSP from the liquid crystal timing controller 34. The gate driver 32a controls the TFT of the liquid crystal panel 32 such that the TFT is turned on in the order of the gate line in accordance with the gate line control signal.

As described later, the source driver 32b receives a source line control signal and an image data signal DT from the liquid crystal timing controller 34. The source driver 32b inputs the image data signal DT to each source line in accordance with a source line control signal. Accordingly, the voltage corresponding to the image data signal DT is applied to the pixel (liquid crystal) corresponding to the turned-on TFT, that is, the data is written.

The liquid crystal timing controller 34 controls the gate driver 32a and the source driver 32b based on a video signal D2 such that the screen of the liquid crystal panel 32 displays the video corresponding to the video signal D2. Specifically, the liquid crystal timing controller 34 inputs the gate line control signals such as the gate clock signal GCK and the gate start pulse signal GSP to the gate driver 32a. The liquid crystal timing controller 34 inputs the source line control signal and the image data signal DT to the source driver 32b.

The touch panel 36 is of a mutual capacitive type included in a projected capacitive type. Although not illustrated in detail, the touch panel 36 includes a capacitive sensor sheet and is disposed to be overlapped with the screen of the liquid crystal panel 32 by direct bonding. The touch panel 36 includes a drive electrode Px (X electrode) and a reception electrode Py (Y electrode). The drive electrodes Px extend in an X-direction (horizontal direction) and are arranged at equal intervals in a Y-direction (vertical direction), and the reception electrodes Py extend in the Y-direction and are arranged at equal intervals in the X-direction. The drive electrode Px and the reception electrode Py are disposed so as to intersect with each other via an adhesive layer (not illustrated). The drive electrode Px receives a drive signal Tx that is the signal for driving the touch panel 36 and is the drive pulse for detecting the user's touch position. When the touch panel 36 is touched by the user while the drive signal Tx is input, the reception electrode Py of the touch panel 36 outputs a position signal Rx corresponding to the user's touch position on the touch panel 36. The position signal Rx is a current signal.

The main interface board 50 includes a scaler (video signal conversion device) 52, a complex programmable logic device (CPLD) 54, and a microcontroller unit (MCU)

56. The scaler 52 is capable of receiving the input of a video signal D1 in accordance with various standards such as DisplayPort or High-Definition Multimedia Interface (HDMI, registered trademark). The scaler 52 converts the input video signal D1 into a video signal D2 that conforms to the signal input condition of the liquid crystal module 30 and inputs the video signal D2 to the liquid crystal timing controller 34 of the liquid crystal module 30. The video signal D2 includes a horizontal synchronization signal HS, a vertical synchronization signal VS, a dot clock signal DCK, the image data signal DT, etc. The scaler 52 has the function to output, for example, a PWM (Pulse Width Modulation) signal. The PWM signal is used as a light adjustment signal for adjusting the brightness of the backlight (not illustrated) of the liquid crystal panel 32. The signal synchronized with the horizontal synchronization signal HS included in the video signal D2 is output as a PWM signal. In other words, the scaler 52 has the function to generate the PWM signal synchronized with the horizontal synchronization signal HS. More specifically, the scaler 52 has the function to generate another form of pulse signal synchronized with the horizontal synchronization signal HS as well as the PWM signal. The scaler 52 is implemented by using, for example, an application specific integrated circuit (ASIC).

The CPLD 54 is coupled to the scaler 52. The CPLD 54 has the function to increase the number of input/output ports of the main interface board 50 including, for example, an input/output port of the scaler 52. The CPLD 54 also functions as a bus selector that divides the bus lines of the main interface board 50 into multiple groups and makes a switch therebetween. The CPLD 54 also has the function to generate various pulse signals used as a reference signal in peripheral circuits. Thus, the CPLD 54 has a general function.

The MCU 56 controls the appropriate elements mounted on the main interface board 50 including the CPLD 54. Specifically, each of the above-described functions performed by the CPLD 54 is implemented under the control of the MCU 56. The MCU 56 includes a memory 58. The memory 58 stores the control program, described later, for controlling the operation of the MCU 56.

The touch panel control board 70 includes a digital back end (DBE) 72, an analog front end (AFE) 74, and an MCU 76.

The DBE 72 cooperates with the AFE 74 to generate the drive signal Tx (drive pulse) and input the drive signal Tx to the touch panel 36. Furthermore, the DBE 72 cooperates with the AFE 74 to receive the input of the position signal Rx output from the touch panel 36 and generate the position data signal representing the user's touch position on the touch panel 36 based on the position signal Rx and the drive signal Tx. The position data signal is input to a main MCU (not illustrated) in the touch panel display 10 and is subjected to the appropriate processing by the main MCU.

The MCU 76 of the touch panel control board 70 controls the appropriate elements mounted on the touch panel control board 70 including the DBE 72. For example, although the cycle of the pulsed drive signal Tx (drive pulse), the number of times the drive signal Tx is scanned, the switching cycle of the drive signal Tx and the position signal Rx (i.e., the switching cycle of the drive electrode Px and the reception electrode Py), and the like, are determined depending on the operation of the DBE 72, the operation of the DBE 72 is controlled by the MCU 76. The MCU 76 includes a memory 78. The memory 78 stores a touch panel control program for controlling the operation of the MCU 76.

In the touch panel display 10, after the scaler 52 receives the video signal D1, the scaler 52 converts the input video signal D1 into the video signal D2 and inputs the video signal D2 to the liquid crystal timing controller 34. The liquid crystal timing controller 34 controls the gate driver 32a and the source driver 32b based on the video signal D2 such that the liquid crystal panel 32 is driven by using an active matrix drive system. To do so, as described above, the liquid crystal timing controller 34 inputs the gate line control signals such as the gate clock signal GCK and the gate start pulse signal GSP to the gate driver 32a. Also, the liquid crystal timing controller 34 inputs the source line control signal and the image data signal DT to the source driver 32b. Accordingly, the gate driver 32a controls the TFT of the liquid crystal panel 32 as appropriate, and the source driver 32b writes data in each pixel as appropriate. As a result, the screen of the liquid crystal panel 32 displays the video corresponding to the video signal D2.

At the same time, the touch panel control board 70 inputs the drive signal Tx to the touch panel 36. In this state, when the touch panel 36 is touched by the user, the touch panel 36 outputs the position signal Rx corresponding to the user's touch position on the touch panel 36. The position signal Rx is input to the touch panel control board 70 and, together with the drive signal Tx, is subjected to the process for generating the above-described position data signal. As described above, the main interface board 50 and the touch panel control board 70 are provided to be overlapped with the liquid crystal panel 32 and control the touch panel 36 including the reception electrode Py, which outputs the position signal corresponding to the user's touch position, and the drive electrode Px, which is opposed to the reception electrode Py.

In the touch panel display 10, gate drive noise N sometimes occurs at the receiving side of the AFE 74, to which the position signal Rx is input, due to the driving of the gate line (the gate of the TFT) of the liquid crystal panel 32. The gate drive noise N is more likely to occur as the sensor surface of the touch panel 36 is larger, i.e., the screen of the liquid crystal panel 32 is larger. Furthermore, the occurrence of the gate drive noise N is more noticeable as the relative distance between the touch panel 36 and the screen of the liquid crystal panel 32 is smaller, particularly in the structure where the touch panel 36 is attached to the screen of the liquid crystal panel 32 by the above-described direct bonding. The occurrence of the gate drive noise N causes, for example, the false recognition of the user's touch on the touch panel 36 even though the touch panel 36 is not touched by the user. That is, the touch panel 36 (strictly speaking, the touch panel system including the touch panel 36 and the touch panel control board 70) may malfunction. Thus, it is desirable to avoid the above-described effect of the gate drive noise N.

Figure 2:
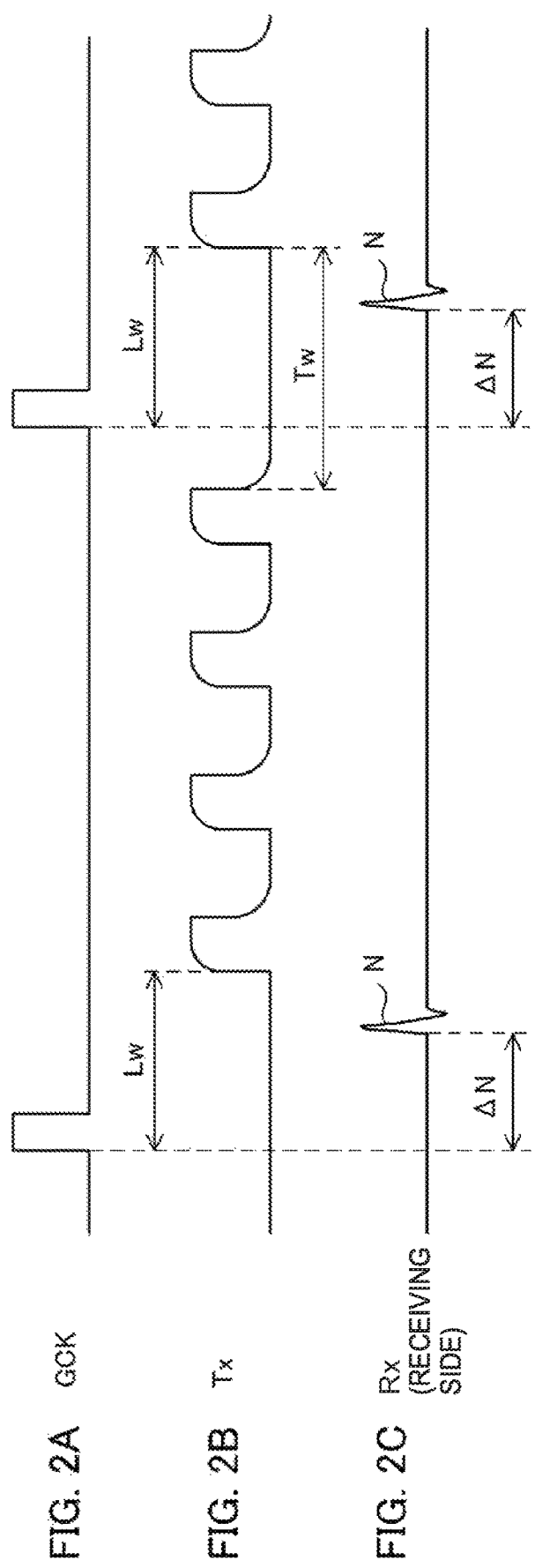
FIG. 2A is a waveform chart schematically illustrating an example of a gate clock signal in the touch panel display according to the reference example.
FIG. 2B is a waveform chart schematically illustrating an example of a drive signal in the touch panel display according to the reference example.
FIG. 2C is a waveform chart schematically illustrating an example of a position signal in the touch panel display according to the reference example.

The gate drive noise N occurs in the timing synchronized with the cycle of the gate clock signal GCK for driving the gate line of the liquid crystal panel 32, strictly speaking, the timing after the elapse of a certain delay time N with respect to the gate clock signal GCK. FIGS. 2A to 2C illustrate this situation. Here, FIG. 2A illustrates the gate clock signal GCK, and FIG. 2B illustrates the drive signal Tx of the touch panel 36. FIG. 2C illustrates the waveform at the receiving side of the AFE 74, to which the position signal Rx is input, when the touch panel 36 is not touched by the user. As illustrated in FIG. 2C, even when the touch panel 36 is not touched by the user, the gate drive noise N occurs at the receiving side of the AFE 74, to which is the position signal Rx is input, in the touch panel 36. The delay time N of the gate drive noise N with respect to the gate clock signal GCK is caused due to the responsiveness of the liquid crystal panel 32, the responsiveness of the touch panel 36, or the like, and is constant as described above.

Because of the above-described relationship between the gate drive noise N and the gate clock signal GCK, it is assumed that, for example, the occurrence timing of the gate drive noise N is estimated based on the gate clock signal GCK so as to avoid the effect of the gate drive noise N. For example, in the configuration in which the liquid crystal timing controller 34 inputs the gate clock signal GCK to the DBE 72, as illustrated in FIG. 1, the DBE 72 cooperates with the AFE 74 to generate the drive signal Tx in consideration of the delay time $\Delta N$ based on the gate clock signal GCK and input the drive signal Tx to the touch panel 36. This makes it possible to avoid the effect of the gate drive noise N.

However, in the configuration where the DBE 72 generates the drive signal Tx based on the gate clock signal GCK acquired from the liquid crystal timing controller 34 and the delay time $\Delta N$, the input of the drive signal Tx to the touch panel 36 is stopped, that is, the generation of the drive pulse of the drive signal Tx is stopped, during a predetermined standby period Lw from the rise timing of the gate clock signal GCK. The drive pulse is a signal for detecting the user's touch position on the touch panel 36. Specifically, the operation of the touch panel 36 is invalid during the standby period Lw. Therefore, as illustrated in FIGS. 2A to 2C, a scan process (position detection process) is not performed during an invalid period Tw of one frame period, and the number of times scanning is executed in the touch panel 36 during one frame period is reduced (four times in FIG. 2B), which results in a disadvantage such as a reduction in the position detection accuracy.

In order to solve the above-described disadvantage, a touch panel display 10a according to the present embodiment has the following configuration.

Figure 3:
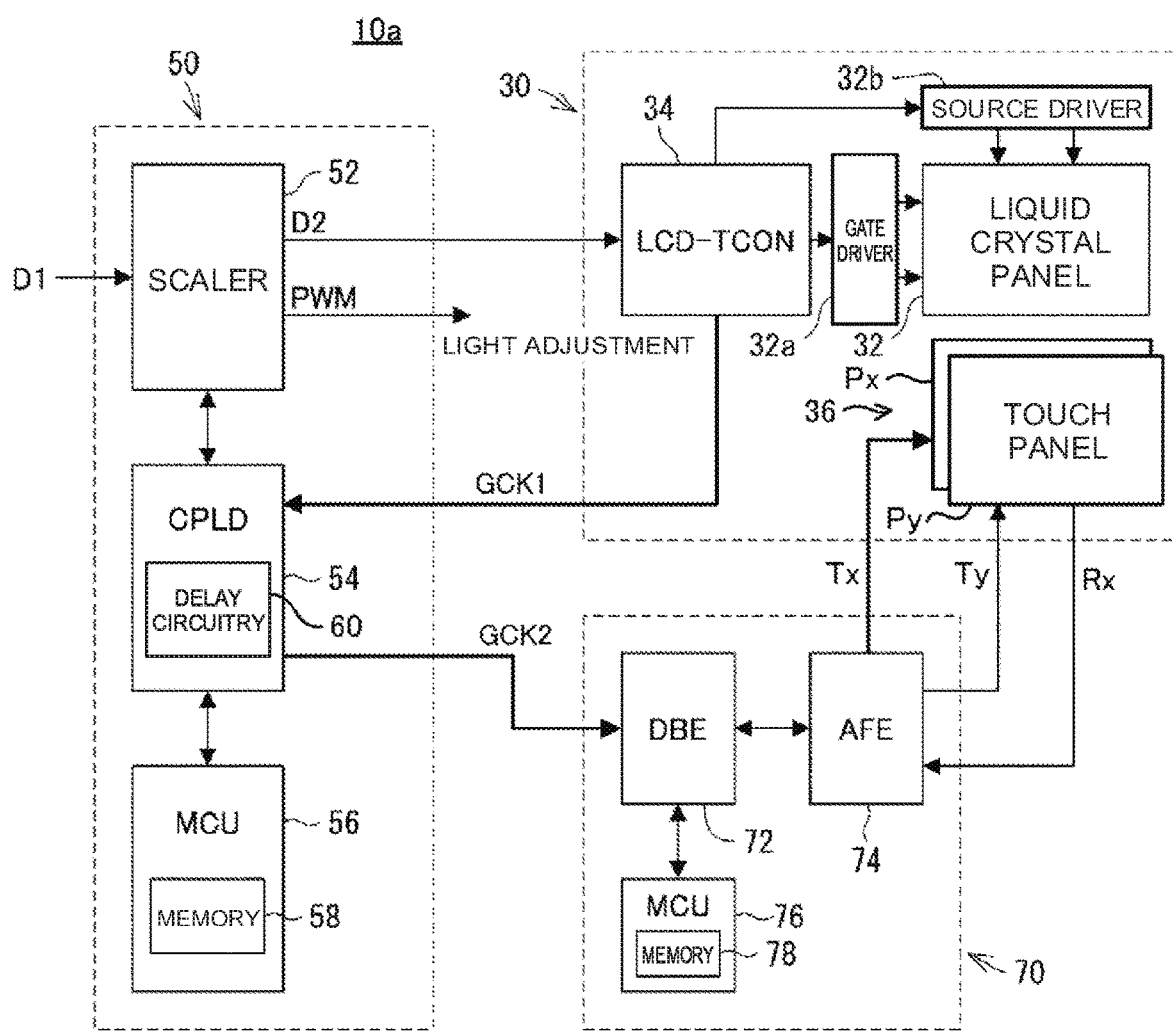
FIG. 3 is a block diagram illustrating a schematic configuration of an electrical part of a touch panel display according to an embodiment of the present disclosure.

Specifically, as illustrated in FIG. 3, in the touch panel display 10a according to the present embodiment, the liquid crystal timing controller 34 inputs the gate clock signal GCK generated by the liquid crystal timing controller 34 to the gate driver 32a and also to the CPLD 54 of the main interface board 50. In the touch panel display 10a according to the present embodiment, the CPLD 54 forms a delay circuitry 60. The CPLD 54 includes a sufficient number of logic circuitries to perform the above-described general functions and to form the delay circuitry 60. Furthermore, in the touch panel display 10a, the AFE 74 outputs the signal having a predetermined voltage level (e.g., GND level) to the drive electrode Px and the reception electrode Py before driving the touch panel 36 (before the position detection process). The other configurations of the touch panel display 10a according to the present embodiment are the same as those of the touch panel display 10 according to the reference example illustrated in FIG. 1. Therefore, the same components are denoted by the same reference numerals as those in FIG. 1, and their descriptions are also omitted.

As illustrated in FIG. 3, the liquid crystal timing controller 34 outputs a gate clock signal GCK1. The gate clock signal GCK1 is input to the delay circuitry 60 of the CPLD 54. The delay circuitry 60 applies a predetermined delay amount Ld to the gate clock signal GCK1 input to the delay circuitry 60.

The delay amount Ld is previously set by the MCU 56. Specifically, the MCU 56 previously measures the period (the delay time $\Delta N$) from the rise timing of the gate clock signal GCK1 until the occurrence timing of the gate drive noise N. For example, in the inspection process after the completion of the touch panel display 10a, the gate clock signal GCK is input to the gate driver 32a so as to cause the gate drive noise N in the touch panel display 10a, and the above-described period is measured. The MCU 56 sets the delay amount Ld based on the above-described measured period. For example, the MCU 56 sets, as the delay amount Ld, the period from the rise timing of the gate clock signal GCK1 until immediately before the occurrence timing of the gate drive noise N. In this manner, the delay amount Ld is individually set for the touch panel display 10a.

Here, the memory 58 of the MCU 56 stores the above-described control program. The control program includes a delay amount setting program. The delay amount setting program is a program for setting the appropriate delay amount Ld in the delay circuitry 60 as described above.

The CPLD 54 applies the delay amount Ld, set by the MCU 56, to the gate clock signal GCK1 and generates a gate clock signal GCK2. The gate clock signal GCK2 generated by the CPLD 54 is input to the DBE 72 of the touch panel control board 70.

The DBE 72 drives the touch panel 36 based on the gate clock signal GCK2 generated by the CPLD 54. Specifically, the DBE 72 cooperates with the AFE 74 to output the drive signal Tx (drive pulse) for detecting the touch position to the drive electrode Px based on the delay amount Ld. Here, the DBE 72 cooperates with the AFE 74 to generate the drive signal Tx (drive pulse) and, at that time, stops inputting the drive signal Tx (drive pulse) to the touch panel 36 during the predetermined standby period Lw based on the gate clock signal GCK2. As a result, the touch panel 36 is in a standby state for the standby period Lw. In other words, the position detection operation by the touch panel 36 is invalid during the standby period Lw.

Here, when the occurrence timing of the gate drive noise N falls within the standby period Lw, specifically, when the occurrence period of the gate drive noise N falls within the standby period Lw, the effect of the gate drive noise N is avoided. For example, FIGS. 4A to 4D illustrate this situation.

Figure 4:
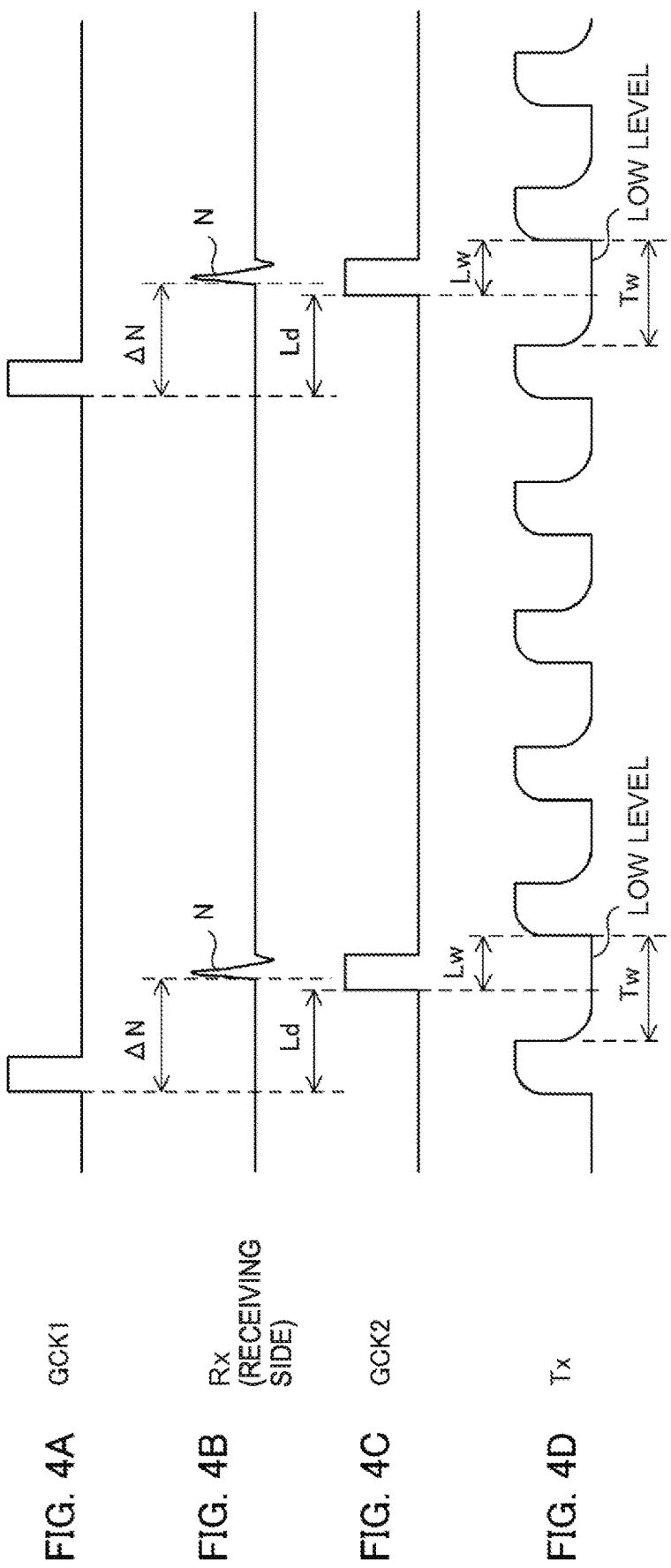
FIG. 4A is a waveform chart schematically illustrating an example of a gate clock signal in the touch panel display according to an embodiment of the present disclosure.
FIG. 4B is a waveform chart schematically illustrating an example of a position signal in the touch panel display according to the embodiment of the present disclosure.
FIG. 4C is a waveform chart schematically illustrating an example of a gate clock signal in the touch panel display according to the embodiment of the present disclosure.
FIG. 4D is a waveform chart schematically illustrating an example of a drive signal in the touch panel display according to the embodiment of the present disclosure.

That is, it is assumed that there is the delay time $\Delta N$ between the gate clock signal GCK1 illustrated in FIG. 4A and the gate drive noise N illustrated in FIG. 4B. FIG. 4B illustrates the situation where it is assumed that the gate drive noise N occurs in the position signal Rx. The delay circuitry 60 applies the delay amount Ld to the gate clock signal GCK1 and generates the gate clock signal GCK2 illustrated in FIG. 4C. The input of the drive signal Tx (drive pulse) illustrated in FIG. 4D to the touch panel 36 is stopped and specifically the generation of the drive pulse of the drive signal Tx is stopped during the predetermined standby period Lw by using the gate clock signal GCK2 as a reference, for example, by using the rise timing of the gate clock signal GCK2 as a reference (base point).

The AFE 74 outputs a low-level (GND-level) signal to the drive electrode Px and the reception electrode Py before outputting the drive signal Tx (drive pulse) to the drive electrode Px. Specifically, the AFE 74 outputs a low-level (GND-level) signal to the drive electrode Px and the reception electrode Py during the predetermined standby period Lw (e.g., 3 s) by using the rise timing of the gate clock signal GCK2 as a reference (base point). The low-level (GND-level) signal is an example of a signal having a predetermined voltage level according to the present disclosure. Specifically, the AFE 74 continuously outputs a low-level signal to the drive electrode Px and the reception electrode Py during the period from the rise timing of the gate clock signal GCK2 to the rise timing of the drive pulse of the drive signal Tx. In this manner, the AFE 74 fixes the drive signal Tx input to the drive electrode Px (X electrode) at a low level and fixes an input signal Ty (see FIG. 3) input to the reception electrode Py (Y electrode) at a low level during the standby period Lw. This allows the position signal Rx to be fixed at a low level during the standby period Lw, and therefore it is possible to prevent the occurrence of the gate drive noise N in the position signal Rx illustrated in FIG. 4B. That is, during the standby period Lw, the waveform at the receiving side of the AFE 74, to which the position signal Rx is input, is fixed at a low level. Thus, the drive electrode Px and the reception electrode Py function as shield electrodes in the touch panel 36 during the standby period Lw.

Here, the start timing of the standby period Lw is determined based on the delay amount Ld by the delay circuitry 60. Therefore, the delay amount Ld by the delay circuitry 60 is previously set such that the occurrence period of the gate drive noise N falls within the standby period Lw. The AFE 74 refrains from outputting the drive pulse of the drive signal Tx to the drive electrode Px during the period from the rise timing of the gate clock signal GCK2 until the end timing of the occurrence period of the gate drive noise N and outputs a low-level signal to the drive electrode Px and the reception electrode Py. This allows the touch panel display 10a to refrain from driving the touch panel 36 during the period from the rise timing of the gate clock signal GCK2 until the end timing of the occurrence period of the gate drive noise N and to fix the drive electrode Px and the reception electrode Py at a low level (GND). Furthermore, it is possible to reduce the radiation noise during the driving of the liquid crystal panel 32. Also, it is possible to reduce the gate drive noise N to the touch panel 36 during the driving of the liquid crystal panel 32. As the electric charge remaining in the touch panel 36 is dischargeable, unnecessary electric charge may be discharged before the touch panel 36 is driven. This improves the position detection accuracy in the touch panel 36.

The touch panel display 10a drives the touch panel 36 based on the gate clock signal GCK2 that is obtained by delaying the gate clock signal GCK1 generated by the liquid crystal timing controller 34 in accordance with the occurrence timing of the gate drive noise N. Specifically, the CPLD 54 generates the gate clock signal GCK2 such that it is overlapped with the occurrence timing of the gate drive noise N, and the DBE 72 generates the drive signal Tx based on the gate clock signal GCK2 and inputs the drive signal Tx to the touch panel 36. Thus, it is possible to shorten the standby period Lw (see FIGS. 4A to 4D) as compared with the reference example (see FIGS. 2A to 2C). As the standby period Lw may be shortened, the invalid period Tw may be also shortened. Thus, the number of times scanning is executed in the touch panel 36 during one frame period may be increased (five times in FIG. 4D), which may improve the position detection accuracy.

The touch panel display 10a is an example of an input display device according to the present disclosure. The main interface board 50 and the touch panel control board 70 are examples of a touch panel control device according to the present disclosure, and the touch panel control board 70 is an example of a touch panel driver according to the present disclosure. The liquid crystal panel 32 is an example of a display panel according to the present disclosure. The MCU 56 is an example of a delay setter according to the present disclosure, and the CPLD 54 is an example of a signal generator according to the present disclosure. The gate clock signal GCK1 is an example of a first gate clock signal according to the present disclosure, and the gate clock signal GCK2 is an example of a second gate clock signal according to the present disclosure.

Although the above example illustrates the signal waveform that is active (high-active) when the gate clock signal is at a high level, it may be the signal waveform that is active (low-active) when the gate clock signal is at a low level. In a case where the gate clock signal is a low-active signal, it operates at the falling timing.

Figure 5:
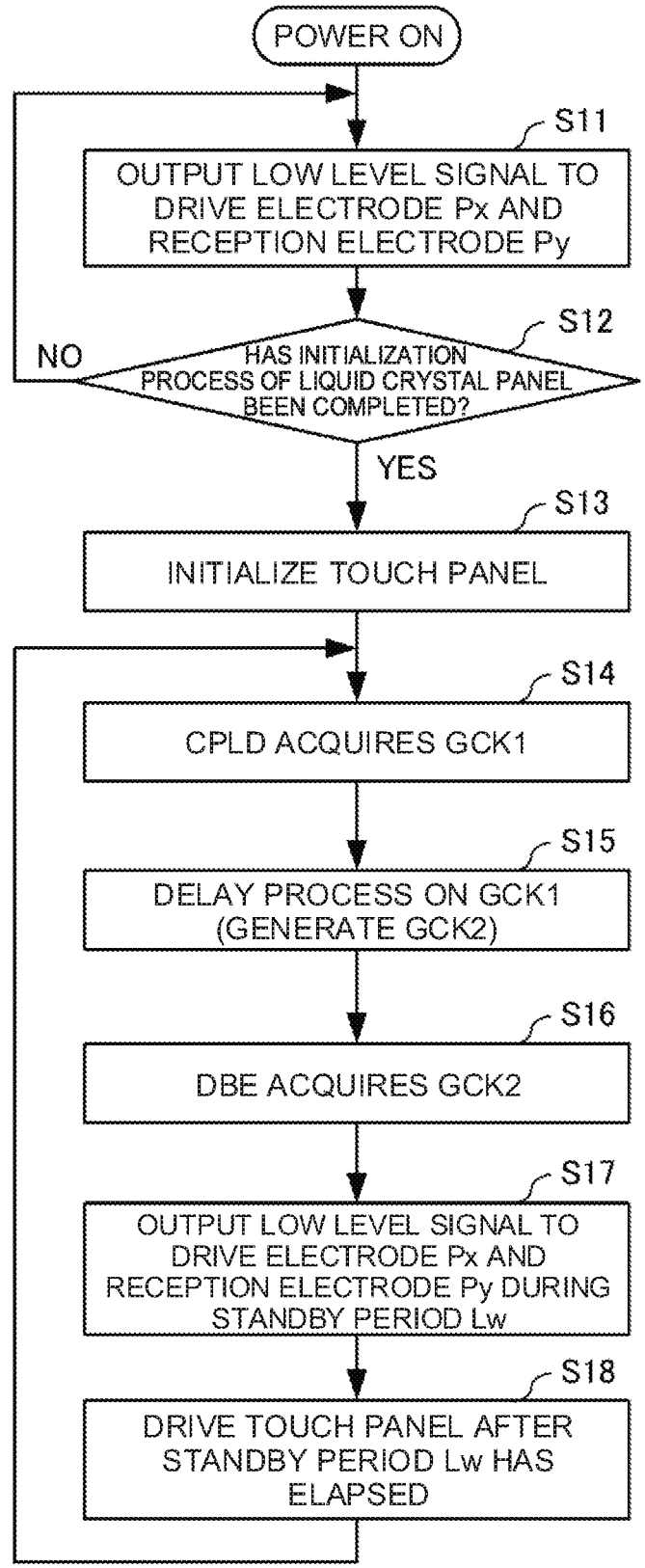
FIG. 5 is a flowchart illustrating the flow of the overall operation of the touch panel display according to the embodiment of the present disclosure.

FIG. 5 illustrates the flow of the overall process (touch panel control process) of the touch panel display 10a according to the present embodiment.

The present disclosure may be regarded as an invention of a touch panel control method by which one or more steps included in the touch panel control process are performed. One or more steps included in the touch panel control process described here may be omitted as appropriate. The steps in the touch panel control process may be executed in a different order as long as the same functional effect is produced. One or more processors may perform the steps in the touch panel control process in a distributed manner. One or more processors may implement the touch panel control method.

First, after the power of the touch panel display 10a is turned on, the AFE 74 outputs a low-level (GND) signal to the drive electrode Px and the reception electrode Py at Step S11. This allows the potentials of the drive electrode Px and the reception electrode Py to be fixed at the GND level. Thus, the electric charge (initial charge) of the drive electrode Px and the reception electrode Py, i.e., the initial charge of the touch panel 36, may be discharged.

Subsequently, at Step S12, the liquid crystal timing controller 34 determines whether the initialization process of the liquid crystal panel 32 has been completed. Here, as irregular noise may occur during the start-up of the liquid crystal panel 32, the AFE 74 continuously outputs a low-level (GND) signal to the drive electrode Px and the reception electrode Py until the initialization process of the liquid crystal panel 32 is complete. In other words, the AFE 74 continuously outputs a low-level signal to the drive electrode Px and the reception electrode Py while the power of the liquid crystal panel 32 is on and the initialization process of the liquid crystal panel 32 is in execution. That is, the AFE 74 fixes the drive electrode Px and the reception electrode Py at a low level until the operations of the liquid crystal panel 32 and the liquid crystal timing controller 34 become stable. When the initialization process of the liquid crystal panel 32 is complete (S12: YES), the process proceeds to Step S13. When the initialization process of the liquid crystal panel 32 is not complete (S12: NO), the process returns to Step S11, and the above-described process is repeated.

At Step S13, the touch panel control board 70 executes the initialization process of the touch panel 36. For example, the touch panel control board 70 executes calibration (e.g., the correction of the touch position) of the touch panel 36. When the initialization process of the touch panel 36 is complete, a transition is made to the normal operation state. After a transition is made to the normal operation state, the video signal D1 is input to the scaler 52.

After the scaler 52 receives the video signal D1, the CPLD 54 acquires the gate clock signal GCK1 output from the liquid crystal timing controller 34 at Step S14.

When the liquid crystal timing controller 34 inputs the gate clock signal GCK to the CPLD 54 (S14), the CPLD 54 (the delay circuitry 60) then applies the delay amount Ld, previously set by the MCU 56, to the gate clock signal GCK1 at Step S15 and generates the gate clock signal GCK2. The MCU 56 performs the process to set the appropriate delay amount Ld in the delay circuitry 60 in accordance with the above-described delay amount setting program.

Subsequently, at Step S16, the DBE 72 of the touch panel control board 70 acquires the gate clock signal GCK2 output from the CPLD 54.

Then, at Step S17, the AFE 74 outputs a low-level (GND) signal to the drive electrode Px and the reception electrode Py during the predetermined standby period Lw by using the rise timing of the gate clock signal GCK2 as a reference (base point). Specifically, the AFE 74 outputs the low-level drive signal Tx to the drive electrode Px and the low-level input signal Ty (see FIG. 3) to the reception electrode Py during the standby period Lw. Thus, the position signal Rx is fixed at a low level during the standby period Lw.

After the standby period Lw has elapsed, at Step S18, the touch panel control board 70 starts to drive the touch panel 36, i.e., starts to input the drive signal Tx (drive pulse) to the touch panel 36, and starts to receive the input of the position signal Rx from the touch panel 36. This allows the overall touch panel display 10a including the touch panel 36 to start up. In the touch panel 36, as described above, the touch position detection operation is invalid during the standby period Lw based on the gate clock signal GCK2, and the drive electrode Px and the reception electrode Py are fixed at a low level. This prevents the malfunction caused by the gate drive noise N.

Subsequently, the process returns to Step S14, and the above-described process is repeated. The series of processes ends when the power of the touch panel display 10a is turned off.

As described above, according to the present embodiment, the appropriate delay amount Ld is set in the delay circuitry 60 based on the cycle of the gate clock signal GCK1 and the occurrence timing of the gate drive noise N, and the drive signal Tx (drive pulse) is input to the touch panel 36 based on the gate clock signal GCK2 obtained by delaying the gate clock signal GCK1 by the delay amount Ld. The drive electrode Px and the reception electrode Py are fixed at a low level during the period in which the gate drive noise N occurs and the gate clock signal GCK2 is active and during the standby period Lw from the rise timing of the gate clock signal GCK2 to the rise timing of the drive pulse of the drive signal Tx. This prevents the effect of the gate drive noise N on the touch panel 36. According to another embodiment, the drive electrode Px and the reception electrode Py may be fixed at a low level during the invalid period Tw (see FIG. 4D) including the standby period Lw.

According to the present embodiment, as illustrated in FIGS. 4A to 4D, as the standby period Lw and the invalid period Tw may be shortened, the number of times scanning is executed in the touch panel 36 during one frame period may be increased. Thus, it is possible to improve the position detection accuracy of the touch panel 36.

The touch panel display according to the present disclosure is not limited to the above-described configuration. Another embodiment of the delay process at Step S15 of FIG. 5 is described below. Step S15 of FIG. 5 is replaceable with, for example, the process illustrated in FIG. 6.

Figure 6:
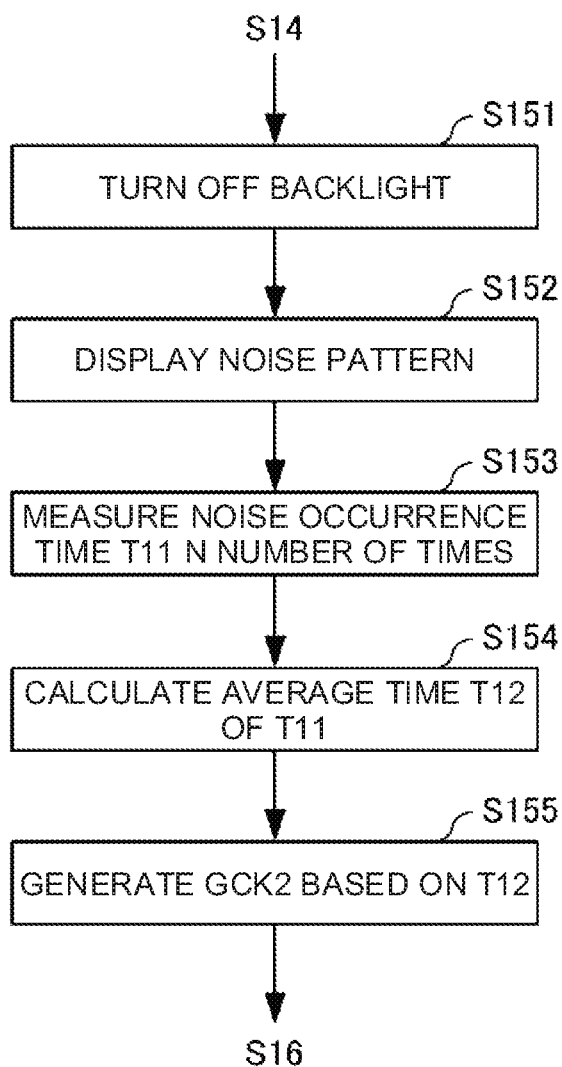
FIG. 6 is a flowchart illustrating the flow of another operation of the touch panel display according to the embodiment of the present disclosure.

At Step S14 of FIG. 5, when the CPLD 54 acquires the gate clock signal GCK1 output from the liquid crystal timing controller 34, the scaler 52 turns off the backlight (black display) with a PWM signal at Step S151 of FIG. 6.

Subsequently, at Step S152, the scaler 52 inputs the video signal D2 of the noise pattern (e.g., the pattern of the two-dot zigzag arrangement) to the liquid crystal timing controller 34. Accordingly, the screen of the liquid crystal panel 32 displays the noise pattern (pattern image).

Then, at Step S153, the MCU 56 monitors the voltage to measure the occurrence time (a noise occurrence time T11) of the gate drive noise N the n number of times. Specifically, the MCU 56 measures the time (the noise occurrence time T11) from the output timing of the gate clock signal GCK1 until the occurrence timing of the gate drive noise N the n number of times. The n number of times the measurement is executed is set to 20 times or less. The MCU 56 executes one measurement at 7.5 s. The MCU 56 increases the number of times the measurement is executed so as to improve the accuracy of measured values.

Then, at Step S154, the MCU 56 calculates an average time T12 of the noise occurrence time T11 acquired during the n times of measurement.

Subsequently, at Step S155, the CPLD 54 generates the gate clock signal GCK2 based on the above-described average time T12. For example, the CPLD 54 sets the delay time (the delay amount Ld) such that the pulse rises 1 s before the occurrence time (the average time T12) of the gate drive noise N so as to generate the gate clock signal GCK2. Then, the process returns to Step S16 in FIG. 5.

The above-described process is executed each time the power of the touch panel display 10a is turned on. This makes it possible to dynamically set the delay amount Ld.

The touch panel display 10a may dynamically set the delay amount Ld with the following configuration. Here, Step S15 of FIG. 5 is replaceable with, for example, the process illustrated in FIG. 7.

Figure 7:
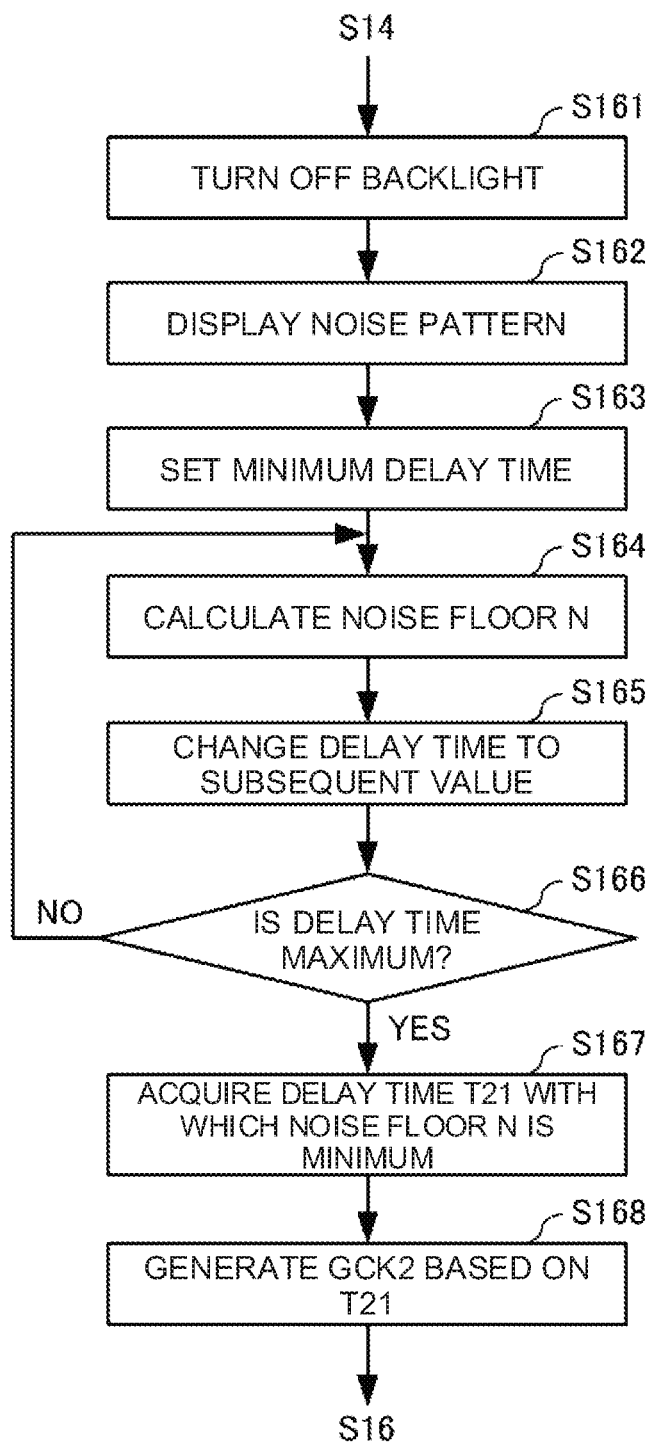
FIG. 7 is a flowchart illustrating the flow of another operation of the touch panel display according to the embodiment of the present disclosure.

At Step S14 of FIG. 5, when the CPLD 54 acquires the gate clock signal GCK1 output from the liquid crystal timing controller 34, the scaler 52 turns off the backlight (black display) with a PWM signal at Step S161 of FIG. 7.

Subsequently, at Step S162, the scaler 52 inputs the video signal D2 of the noise pattern (e.g., the pattern of the two-dot zigzag arrangement) to the liquid crystal timing controller 34. Accordingly, the screen of the liquid crystal panel 32 displays the noise pattern.

Then, at Step S163, the MCU 56 sets the minimum delay time.

Subsequently, at Step S164, the MCU 56 calculates a noise floor N. For example, when the detected value is d(x,y), the noise floor N is calculated by the following equation. In the following equation, E represents the sum of the X axis (0 to X) and the Y axis (0 to Y).

$$N(i) = (\Sigma\Sigma|d(x,y)|)/(X \times Y)$$

Then, at Step S165, the MCU 56 changes the delay time to the subsequent value. Steps S164 to S166 are repeated until the delay time reaches a maximum. The MCU 56 acquires each of the noise floors N, which are calculated until the delay time is changed to a maximum, and stores each of the noise floors N in the N(i) array.

When the delay time reaches a maximum (S166: YES), the MCU 56 acquires a delay time T21 with which the noise floor N is the minimum at Step S167.

Then, at Step S168, the CPLD 54 generates the gate clock signal GCK2 based on the delay time T21. For example, the CPLD 54 applies the delay time T21 (the delay amount Ld) to the gate clock signal GCK1 and generates the gate clock signal GCK2.

The above-described process is executed each time the power of the touch panel display 10a is turned on. This makes it possible to dynamically set the delay amount Ld.

With a touch panel display according to another embodiment of the present disclosure, for example, in the waveform charts illustrated in FIGS. 2A to 2C, the AFE 74 may output a low-level (GND) signal to the drive electrode Px and the reception electrode Py during the predetermined standby period Lw from the rise timing of the gate clock signal GCK. Specifically, the AFE 74 fixes the drive signal Tx input to the drive electrode Px (X electrode) at a low level and fixes the input signal Ty (see FIG. 3) input to the reception electrode Py (Y electrode) at a low level during the standby period Lw. In this configuration, it may be ensured that the effect of noise on the touch panel 36 is reduced as the drive electrode Px and the reception electrode Py are fixable at a low level for a long period (the standby period Lw) although the number of times scanning is executed in the touch panel 36 during one frame period is the same as that in the conventional configuration.

In each of the above-described embodiments, the AFE 74 may output a low-level signal to the drive electrode Px and the reception electrode Py for each line (each time one gate line is driven) or for each plurality of lines or may output a low-level signal to the drive electrode Px and the reception electrode Py for each frame or for each plurality of frames.

The present disclosure is suitable for an electronic blackboard. Specifically, in the electronic blackboard, the screen of the liquid crystal panel 32 displays the trajectory of the user's touch position on the touch panel 36. In the electronic blackboard, for example, if the effect of the gate drive noise N is not avoided, the effect of the gate drive noise N causes the screen of the liquid crystal panel 32 to display an unintentional pattern, such as a point or a line, which is completely unrelated to the user's touch operation. The present disclosure is extremely suitable to avoid such an inconvenience.

The present disclosure is applicable to not only the liquid crystal module 30 but also the configuration adopting, for example, an organic EL (Electro-Luminescence) display using an active matrix drive system. That is, the present disclosure is applicable to the configuration adopting a display device using an active matrix drive system. The present disclosure is appliable to a display device using other than an active matrix drive system, e.g., a display device using a simple matrix drive system, or, in the extreme, a display device using a CRT (Cathode Ray Tube) system.

The scope of the present disclosure is not limited to the scope of description herein and is represented by the scope of claims. In this case, all the contents and the scopes equivalent to the scope of claims are included.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A touch panel control device that controls a touch panel disposed to overlap with a display panel and including a reception electrode that outputs a position signal corresponding to a touch position touched by a user and a drive electrode that is opposite to the reception electrode, the touch panel control device comprising:
   a delay setter that sets a delay amount corresponding to a first gate clock signal for controlling a drive timing of a gate line provided in the display panel;
   a signal generator that applies the delay amount set by the delay setter to the first gate clock signal to generate a second gate clock signal; and
   a touch panel driver that outputs a drive pulse for detecting the touch position to the drive electrode based on the second gate clock signal generated by the signal generator, wherein
   the touch panel driver outputs a signal having a predetermined voltage level to the drive electrode and the reception electrode during a period from a rise timing of the second gate clock signal to a rise timing of the drive pulse before outputting the drive pulse to the drive electrode.

2. The touch panel control device according to claim 1, wherein
   the touch panel driver further outputs the signal having the predetermined voltage level to the drive electrode and the reception electrode continuously during the period from the rise timing of the second gate clock signal to the rise timing of the drive pulse.

3. The touch panel control device according to claim 2, wherein the delay setter sets, as the delay amount, a period from a rise timing of the first gate clock signal to a moment immediately before an occurrence timing of noise that occurs in the position signal due to driving of the gate line.

4. The touch panel control device according to claim 3, wherein the touch panel driver refrains from outputting the drive pulse to the drive electrode and outputs the signal having the predetermined voltage level to the drive electrode and the reception electrode during a period from the rise timing of the second gate clock signal to an end timing of an occurrence period of the noise.

5. The touch panel control device according to claim 1, wherein the delay setter sets the delay amount individually for each touch panel.

6. The touch panel control device according to claim 1, wherein the touch panel driver outputs the signal having the predetermined voltage level to the drive electrode and the reception electrode continuously while the display panel is turned on and an initialization process of the display panel is executed.

7. The touch panel control device according to claim 1, wherein the signal having the predetermined voltage level includes a ground level signal.

8. The touch panel control device according to claim 1, wherein the touch panel includes a capacitive touch panel.

9. The touch panel control device according to claim 1, wherein the touch panel is attached to the display panel by direct bonding.

10. An input display device comprising:
    a display device that displays an image on a display panel;
    a touch panel that is disposed to overlap with the display device and outputs a position signal corresponding to a user's touch position; and
    the touch panel control device according to claim 1.

11. A touch panel control method for controlling a touch panel disposed to overlap with a display panel and including a reception electrode that outputs a position signal corresponding to a touch position touched by a user and a drive electrode that is opposite to the reception electrode, the touch panel control method comprising causing one or more processors to execute:
    a delay setting process for setting a delay amount corresponding to a first gate clock signal for controlling a drive timing of a gate line provided in the display panel;
    a signal generating process for applying the delay amount set in the delay setting process to the first gate clock signal to generate a second gate clock signal; and
    a touch panel driving process for outputting a drive pulse for detecting the touch position to the drive electrode based on the second gate clock signal generated in the signal generating process, wherein in the touch panel driving process, a signal having a predetermined voltage level is output to the drive electrode and the reception electrode during a period from a rise timing of the second gate clock signal to a rise timing of the drive pulse before the drive pulse is output to the drive electrode.

* * * * *